(12) United States Patent
Abe et al.

(10) Patent No.: US 7,376,659 B2
(45) Date of Patent: May 20, 2008

(54) SYSTEM, METHOD, AND COMPUTER PROGRAM PRODUCT FOR GENERATING A WEB APPLICATION WITH DYNAMIC CONTENT

(75) Inventors: Mari Abe, Yokohama (JP); Hideki Tai, Yokohama (JP); Takashi Nerome, Yokohama (JP); Masahiro Hori, Nishinomiya (JP); Kentaro Fukuda, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/864,046

(22) Filed: Jun. 7, 2004

(65) Prior Publication Data

US 2004/0268303 A1    Dec. 30, 2004

(30) Foreign Application Priority Data

Jun. 11, 2003    (JP)    ............................. 2003-166385

(51) Int. Cl.
*G06F 17/30*    (2006.01)
*G06F 7/00*    (2006.01)

(52) U.S. Cl. .................... 707/101; 707/102; 707/10
(58) Field of Classification Search ................ 707/101, 707/102, 10, 2
See application file for complete search history.

(56) References Cited

U.S. PATENT DOCUMENTS

| | | | | |
|---|---|---|---|---|
| 5,616,876 A | * | 4/1997 | Cluts ........................... | 84/609 |
| 6,961,750 B1 | * | 11/2005 | Burd et al. .................. | 709/203 |
| 7,096,418 B1 | * | 8/2006 | Singhal et al. ........... | 715/501.1 |
| 2002/0105539 A1 | * | 8/2002 | Gamzon et al. ............ | 345/738 |
| 2002/0196976 A1 | * | 12/2002 | Mihcak et al. .............. | 382/173 |
| 2003/0004993 A1 | * | 1/2003 | Templeton et al. ......... | 707/513 |

(Continued)

FOREIGN PATENT DOCUMENTS

| | | |
|---|---|---|
| JP | 2001134423 A2 | 5/2001 |
| JP | 92001027946 A2 | 1/2002 |
| JP | 92002245068 A2 | 8/2002 |

OTHER PUBLICATIONS

Scott Tilley, Shihong Huang, "Evaluating the Reverse Engineering Capabilities of Web Tools for Understanding Site Content and Structure: A Case Study", Proceedings of the 23rd International Conference on Software Engineering (ICSE2001: May 12-19, 2001; Toronto, Canada), p. 514 to 523, Los Alamitos, CA: IEEE Computer Society Press, 2001, referred to hereafter as Tilley.

(Continued)

*Primary Examiner*—Kuen S. Lu

(57) ABSTRACT

A system, method, and computer program product for generating a web application, including objects and web pages dynamically generated on a server, which can be used to generate a web application model to support a change or reconstruction of the system.

A classification processing section analyzes and classifies the configuration of static HTML contents captured by executing a web application. A template extracting section extracts a template for dynamic HTML contents from the web application using the results of the classification. On the basis of the results of the classification by the classification processing section and access information obtained by capturing the static HTML contents, a transition extracting section extracts transition information on the web application to be processed. Then, on the basis of the extracted template and transition information, model generating means renders an HTML document generating a model of the web application, to generate an image.

4 Claims, 15 Drawing Sheets

U.S. PATENT DOCUMENTS

| | | | |
|---|---|---|---|
| 2003/0033221 A1* | 2/2003 | Fuwa et al. | 705/27 |
| 2003/0069877 A1* | 4/2003 | Grefenstette et al. | 707/2 |
| 2004/0039795 A1* | 2/2004 | Percival | 709/218 |
| 2004/0059997 A1* | 3/2004 | Allen et al. | 715/501.1 |
| 2004/0103389 A1* | 5/2004 | Song et al. | 717/107 |
| 2004/0217985 A9* | 11/2004 | Ries et al. | 345/740 |

OTHER PUBLICATIONS

Ahmed E. Hassan and Richard C. Holt, "Architecture recovery of web applications", Proceedings of the 24th International Conference on Software Engineering (ICSE2002), p. 349 to 359, referred to hereafter as Hassan.

Tancred Lindholm, "A 3-way Merging Algorithm for Synchronizing Ordered Trees—The 3DM Merging and Differencing Tool for XML", Master's Thesis, Helsinki University of Technology, Sep. 13, 2001, available at www.cs.hut.fi/~ctl/3dm/ referred to hereafter as Lindholm.

Sudarshan S. Chawathe and Anand Rajaraman and Hector Garcia-Molina and Jennifer Widom, "Change Detection in Hierarchically Structured Information", Proceedings of the 1996 ACM SIGMOD International Conference on Management of Data, p. 493 to 504, referred to hereafter as Sudarshan.

* cited by examiner

[Figure 1]
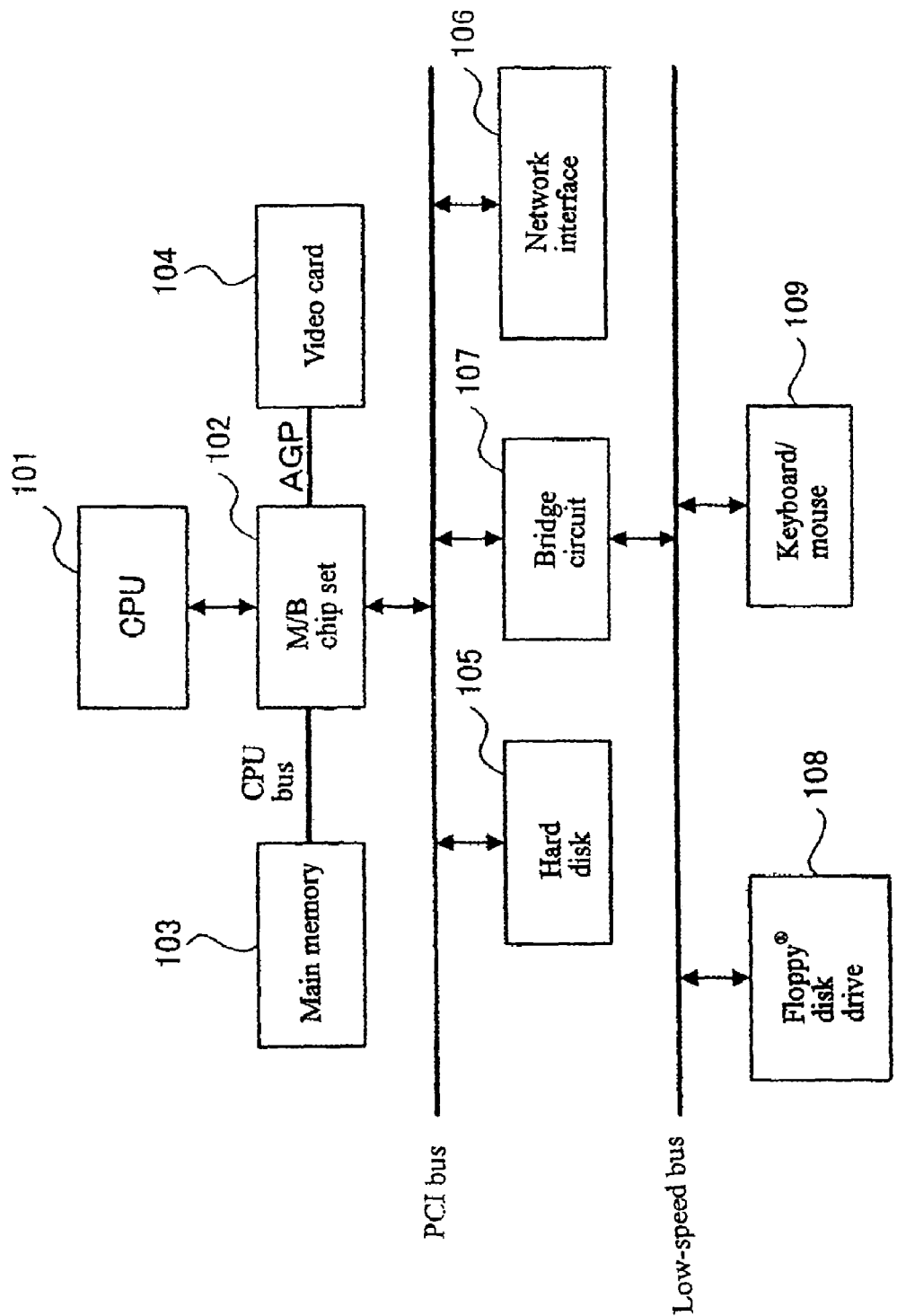

[Figure 2]
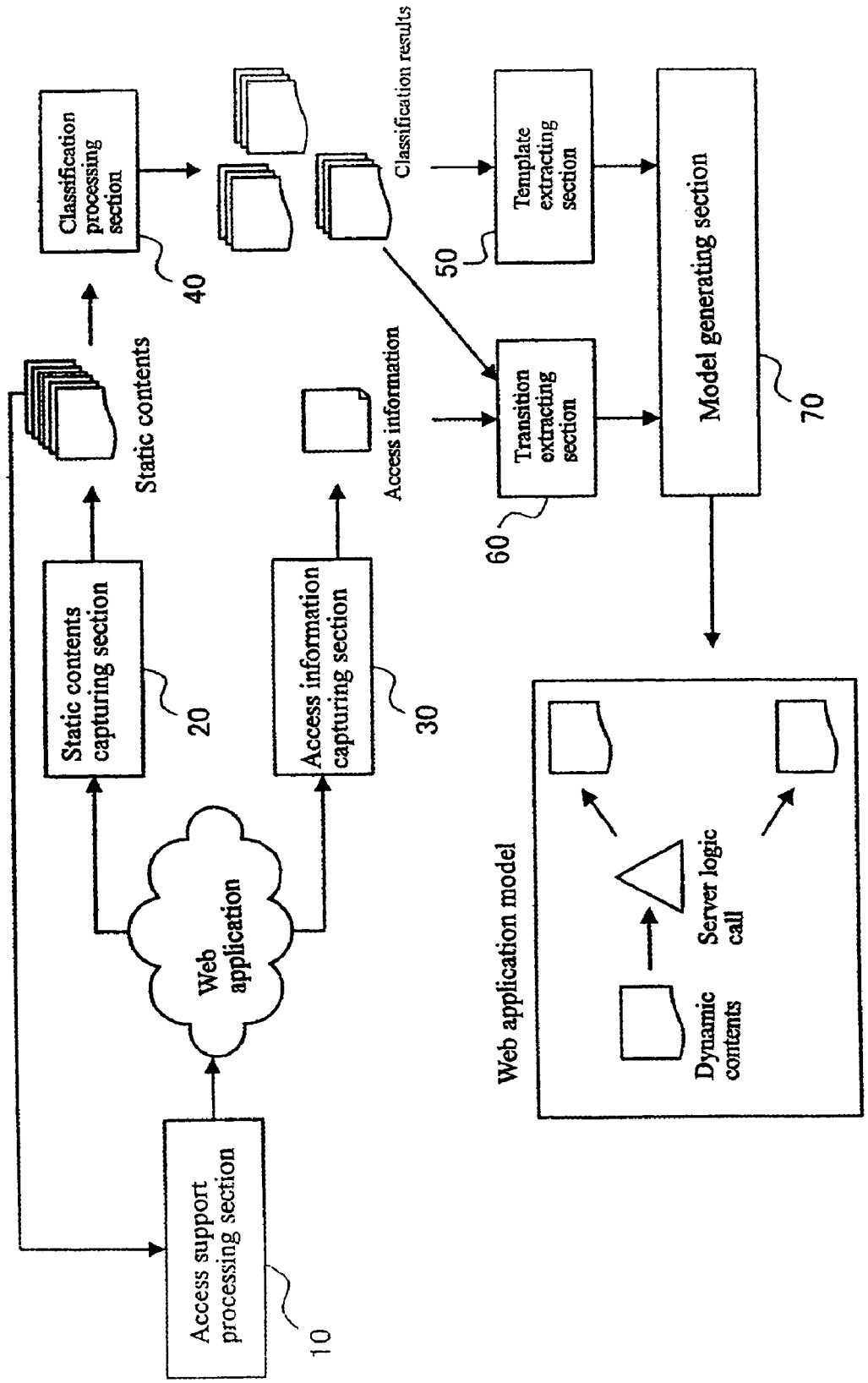

[Figure 3]
| Request | URI | Response |
|---|---|---|
| 00.html | /eShop/catalog.jsp | 01.html |
| 01.html | /eShop/cart.do?id=0 | 02.html |
| 01.html | /eShop/checkout.do | 03.html |
| ⋮ | ⋮ | ⋮ |
[Figure 4]
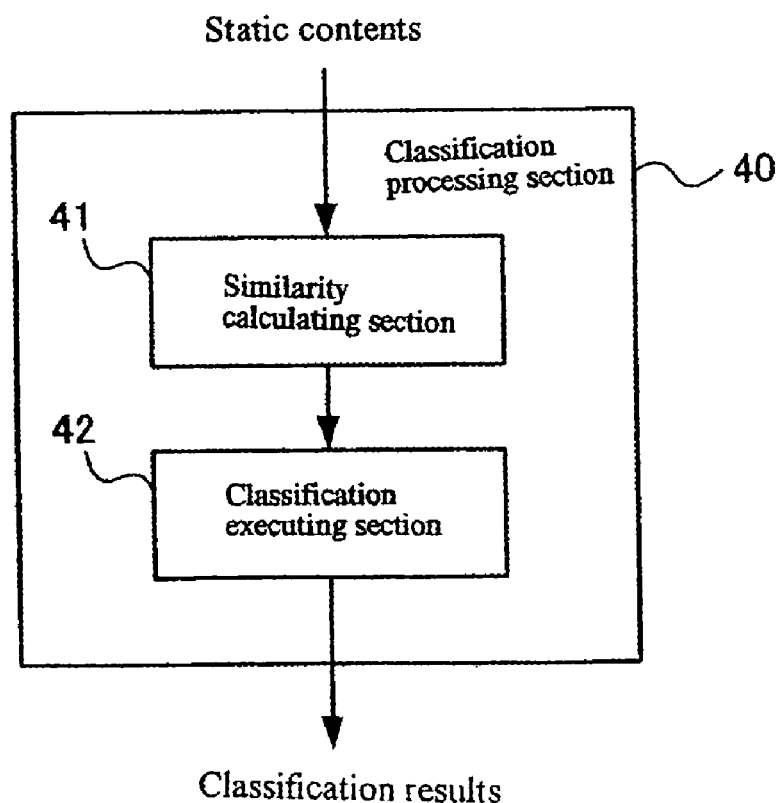

[Figure 5]

Document 2

```
<form action="/cgi-bin/keijiban.cgi" method="post">
<label> Contribute to bulletin board <br>
<textarea name="kiji" rows="4" cols="40">
Write your contributed contents here
</textarea>
</label>
<p>
<input type="submit" value="Transmit">
<input type="reset" value="Reset">
</form>
```
522

```
<form action="/cgi-bin/submit.cgi" method="post">
<label> Mail <input type="text" name="email"></label><br>
<label>Name<input type="text" name="namae"></label><br>
<input type="submit" value="Transmit">
<input type="reset" value="Reset">
</form>
```
521

Document 1

```
<form action="/cgi-bin/submit.cgi" method="post">
<label>Name<input type="text" name="namae"></label><br>
<label> Mail <input type="text" name="email"></label><br>
<input type="submit" value="Transmit">
<input type="reset" value="Reset">
</form>
<p>
```
511

```
<form action="/cgi-bin/sample.cgi" method="post">
<label> Opinion <br>
<textarea name="iken" rows="4" cols="40">
Write your opinion here
</textarea>
</label>
<p>
<input type="submit" value="Transmit">
<input type="reset" value="Reset">
</form>
```
512

[Figure 6]
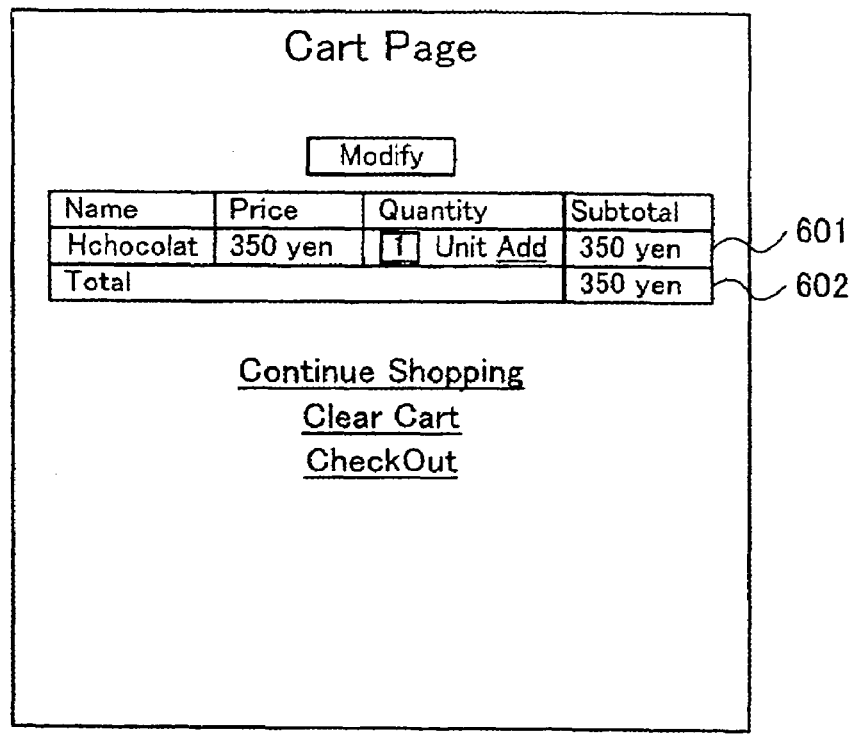
[Figure 7]
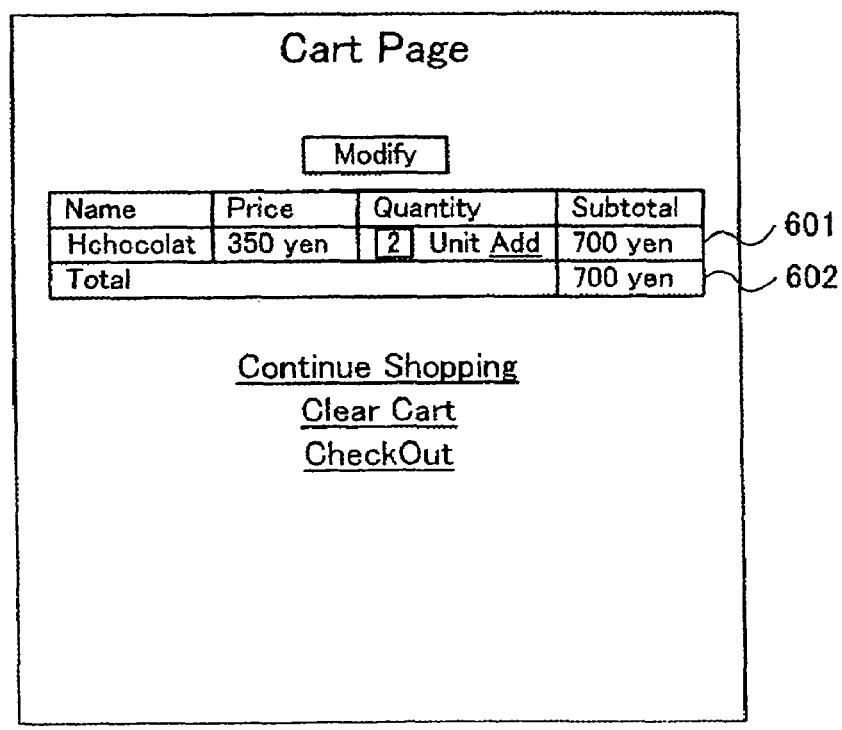

[Figure 8]
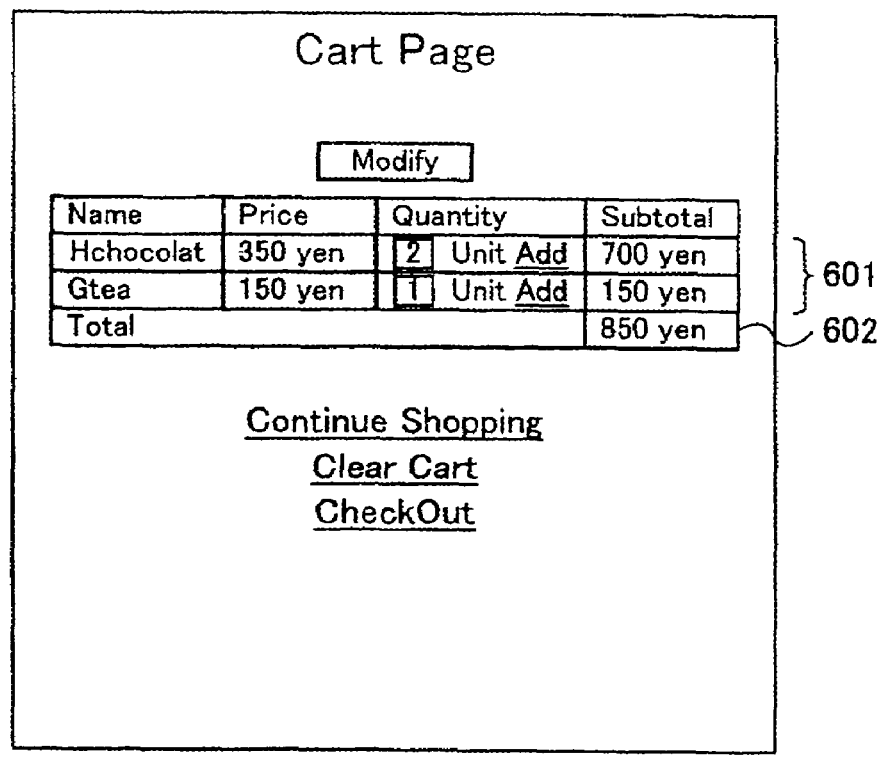
[Figure 9]
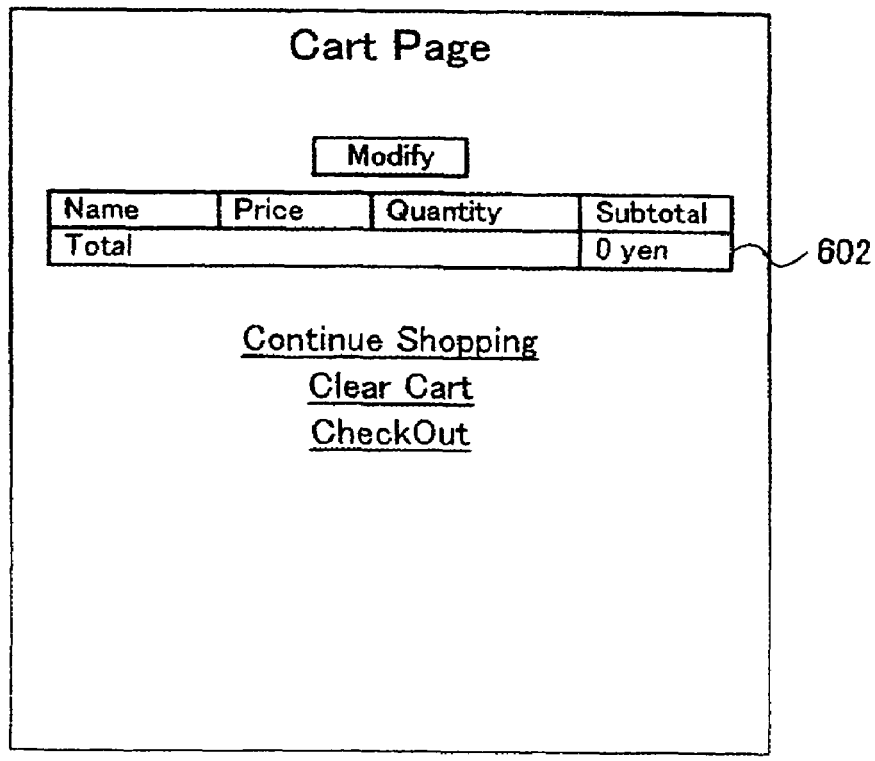

[Figure 10]
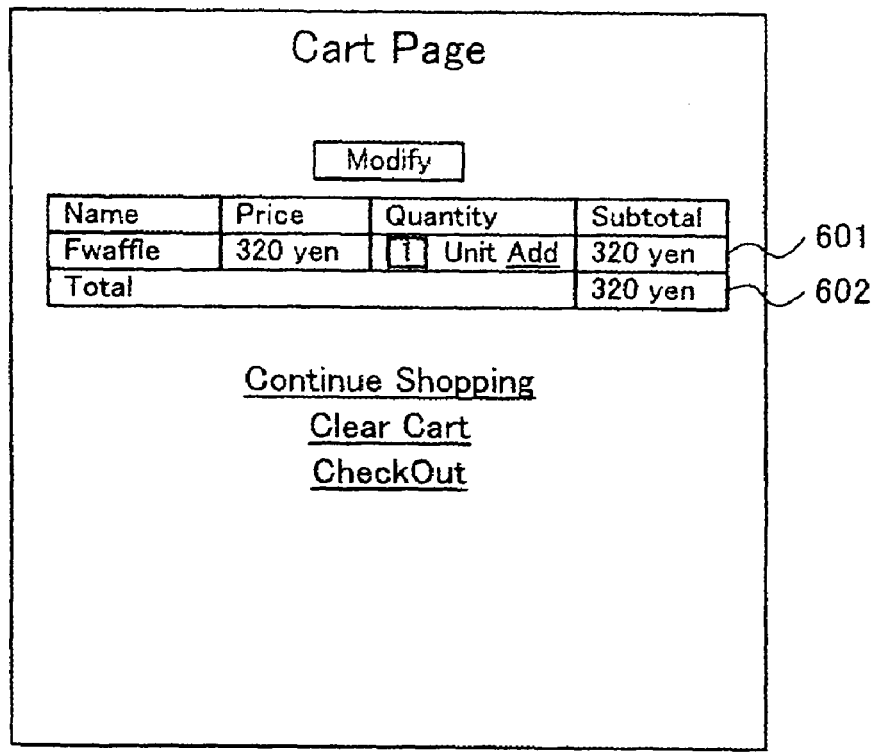
[Figure 11]
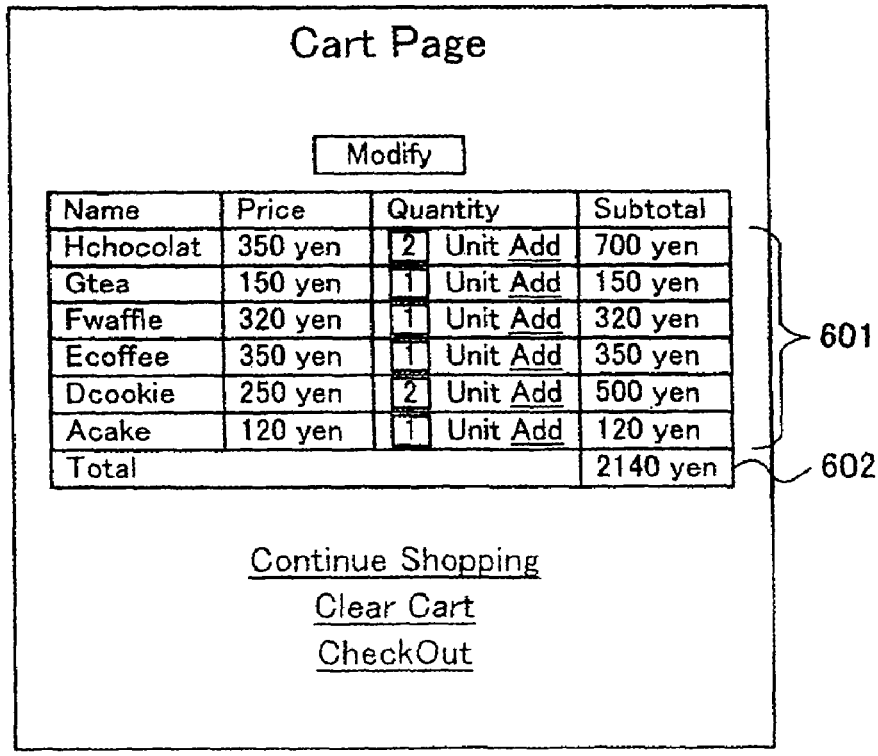

[Figure 12]
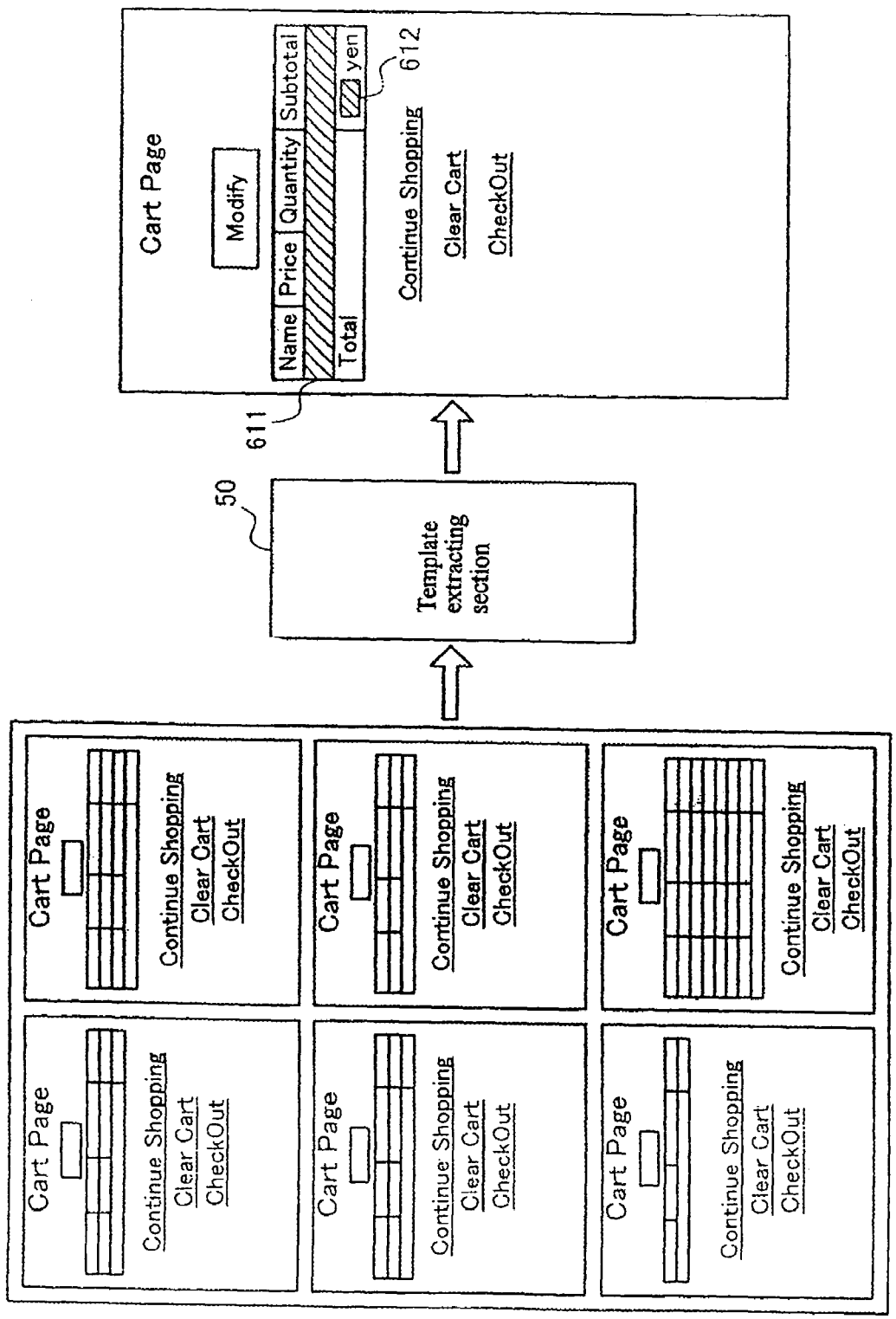

| Hchocolat | 350 yen | [1] Unit Add | 350 yen |

| Hchocolat | 350 yen | [2] Unit Add | 700 yen |

| Hchocolat | 350 yen | [2] Unit Add | 700 yen |
|-----------|---------|--------------|---------|
| Gtea      | 150 yen | [1] Unit Add | 150 yen | null

| Fwaffle | 320 yen | [1] Unit Add | 320 yen |

| Hchocolat | 350 yen | [2] Unit Add | 700 yen |
|-----------|---------|--------------|---------|
| Gtea      | 150 yen | [1] Unit Add | 150 yen |
| Fwaffle   | 320 yen | [1] Unit Add | 320 yen |
| Ecoffee   | 350 yen | [1] Unit Add | 350 yen |
| Dcookie   | 250 yen | [2] Unit Add | 500 yen |
| Acake     | 120 yen | [1] Unit Add | 120 yen |

(B)
350
700
850
0
320
2140

[Figure 14]
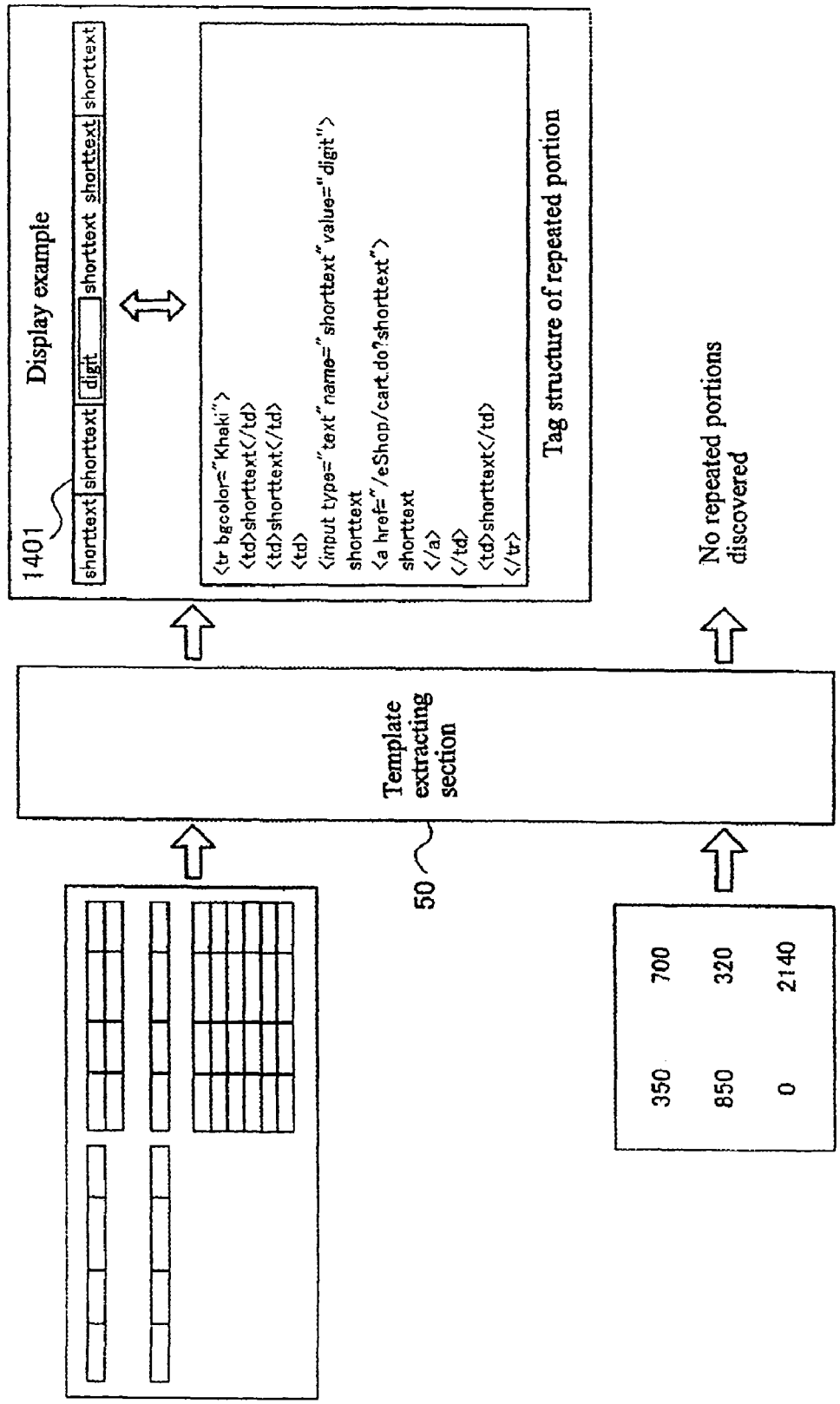

[Figure 15]
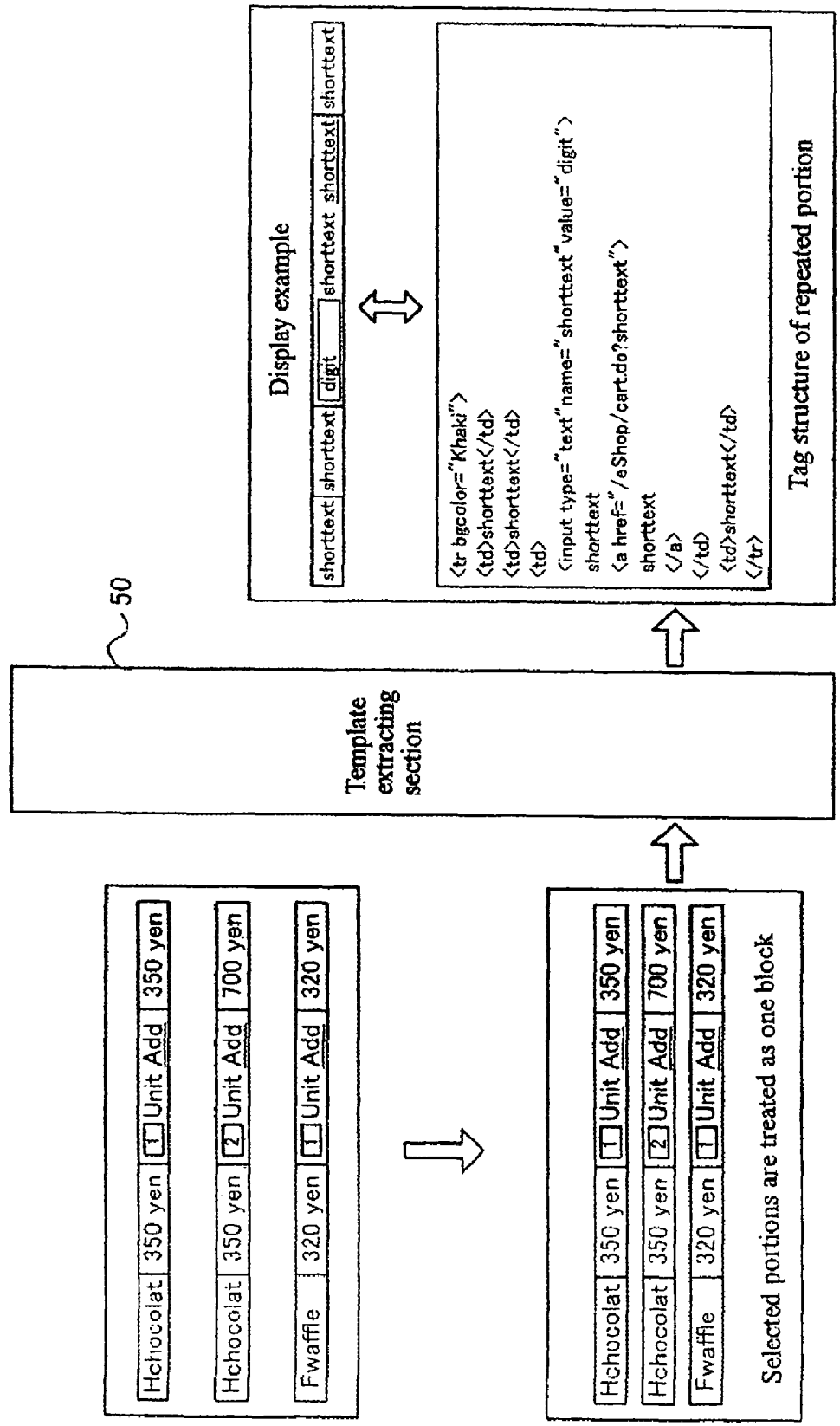

[Figure 16]
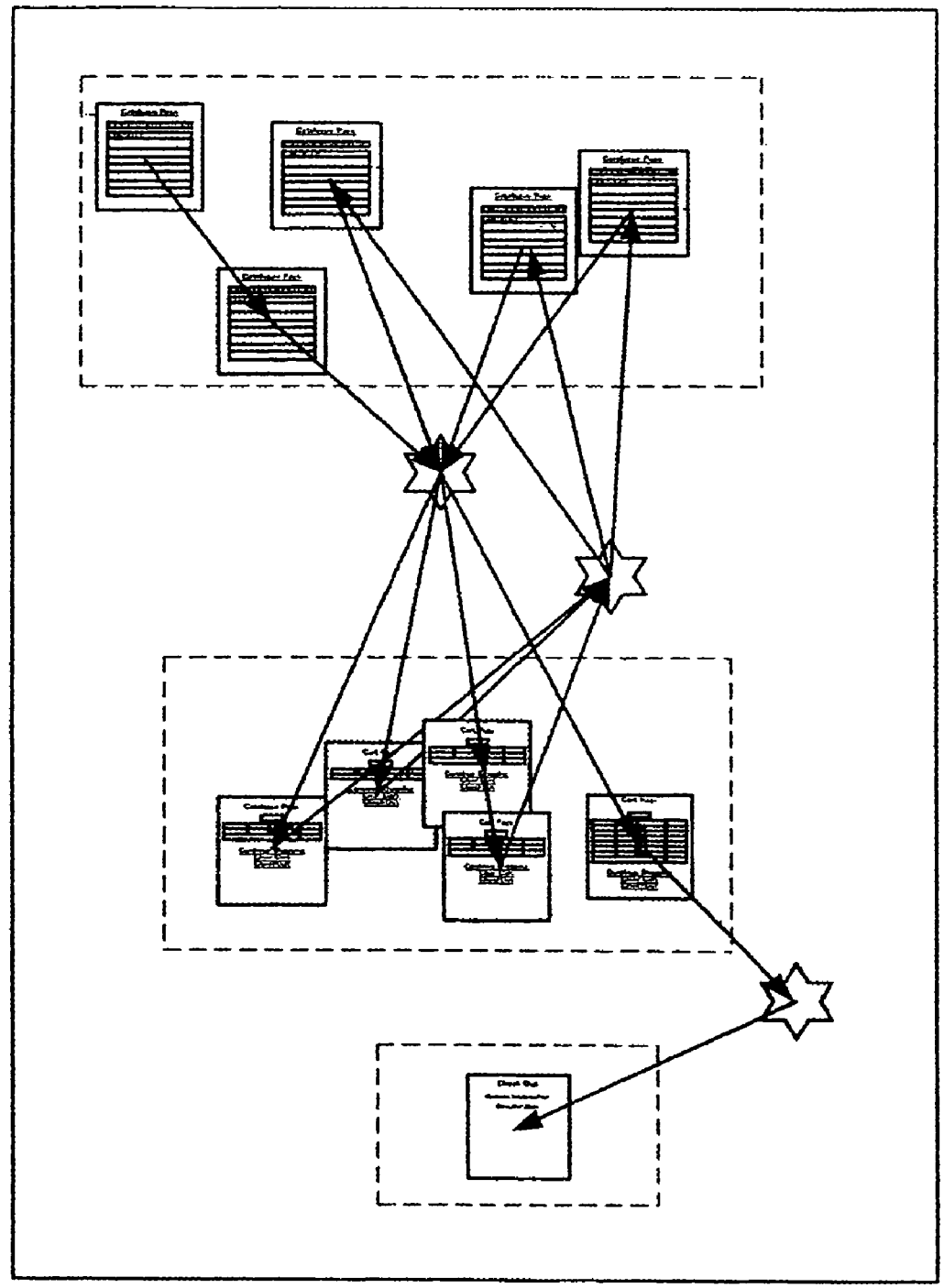

[Figure 17]
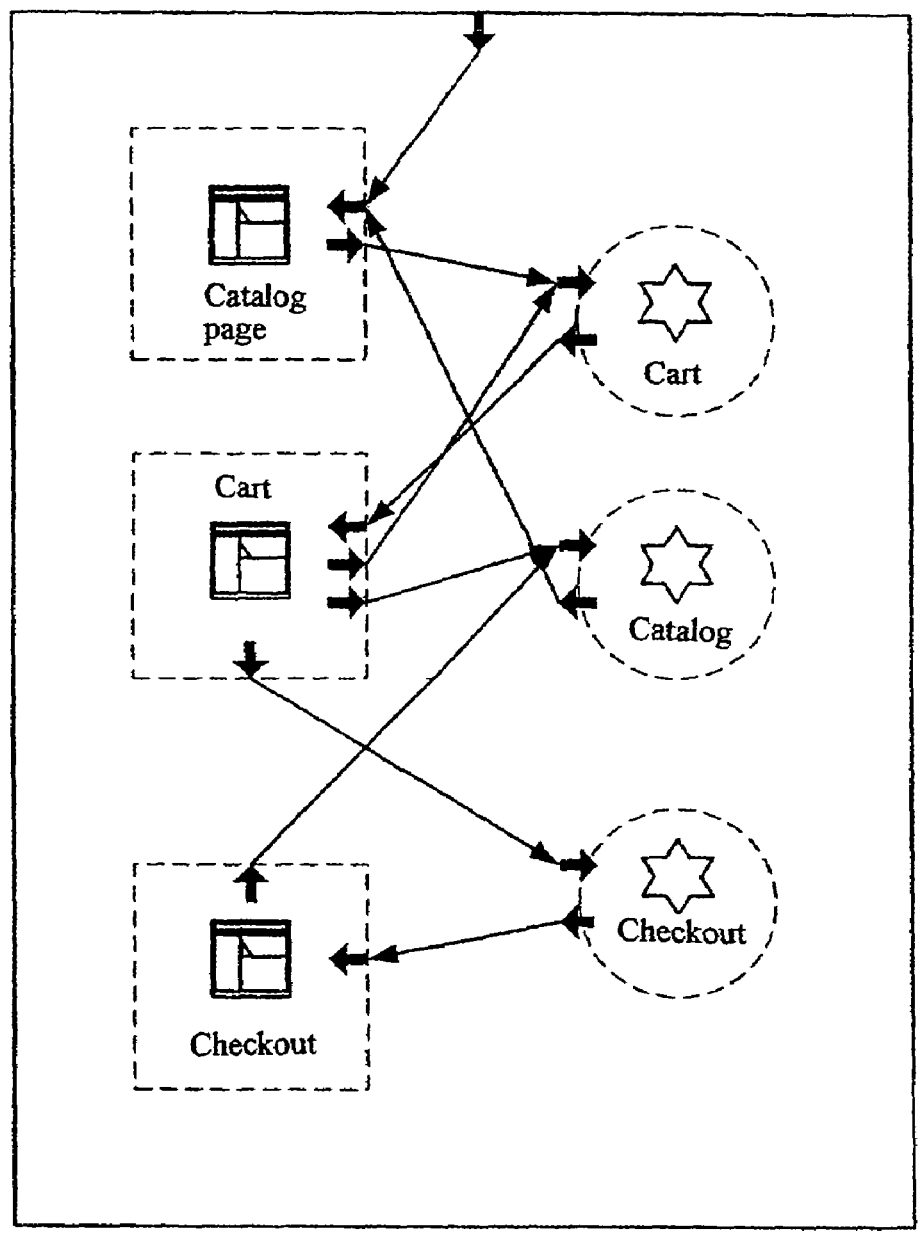

[Figure 18]
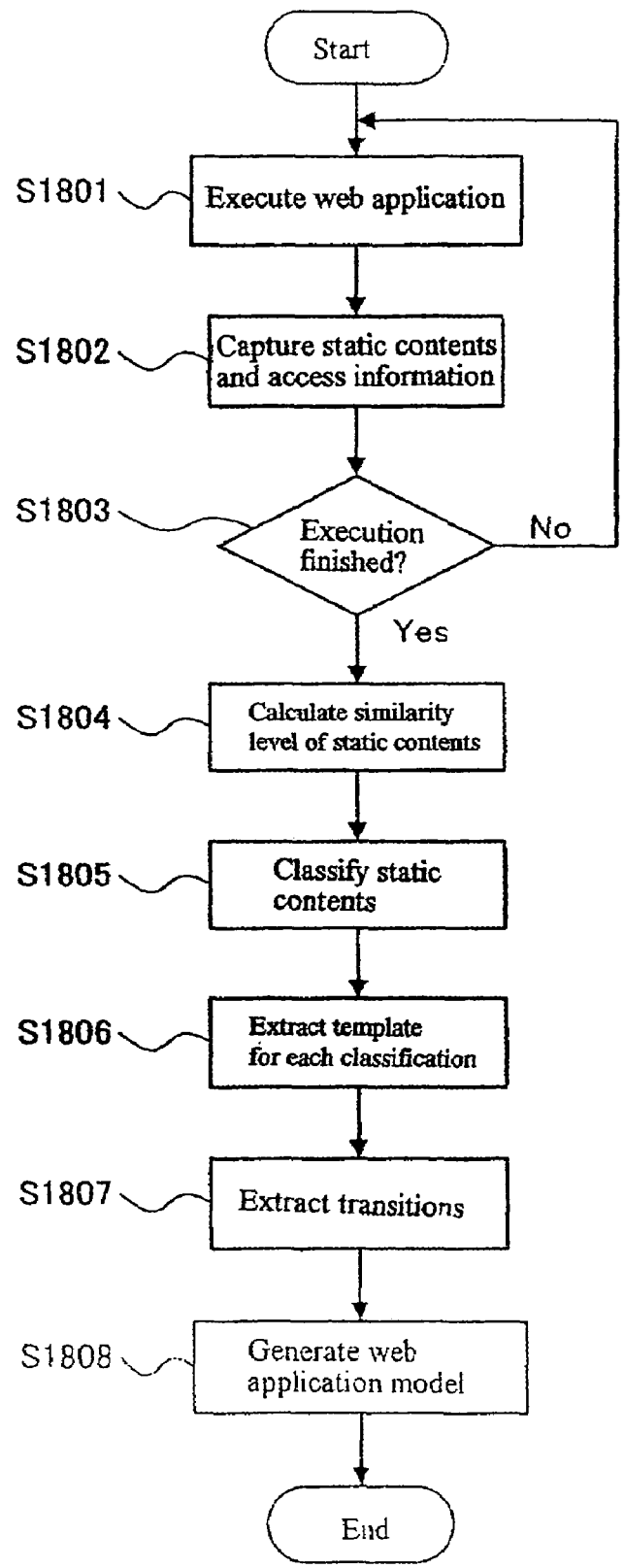

[Figure 19]
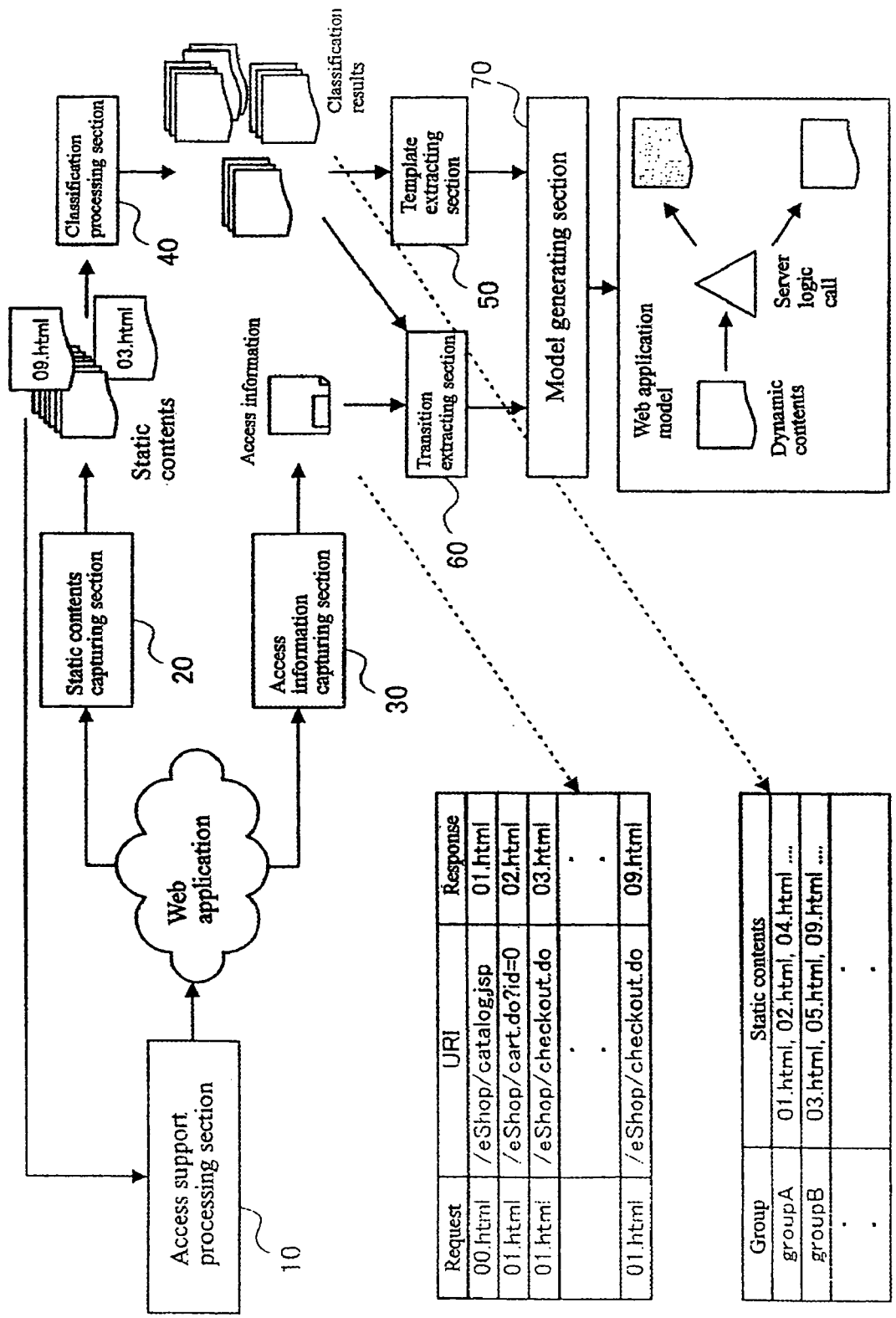

SYSTEM, METHOD, AND COMPUTER PROGRAM PRODUCT FOR GENERATING A WEB APPLICATION WITH DYNAMIC CONTENT

FIELD OF THE INVENTION

This invention relates to performing reverse engineering for a web application. Specifically, the invention can use objects and web contents dynamically generated on a server to generate a web application model to support a change or reconstruction of a system.

DESCRIPTION OF RELATED ART

The following documents are hereby incorporated by reference:

JP2001134423A2, "Method for Outputting Picture Information of New System Using Interactive Existing System", Japanese Published Unexamined Patent Application No. 2001-134423, by Maejima Yasunori et al., filed Nov. 8, 1999, referred to hereafter as Yasunori.

JP2001027946A2, "Method for Outputting Screen Information of Interactive Program System, Japanese Published Unexamined Patent Application No. 2001-27946, by Umezawa Ikuyo et al., filed Jul. 14, 1999, referred to hereafter as Ikuyo.

JP2002245068A2, "Method and System for Processing Information, Program and Recording Medium", Japanese Published Unexamined Patent Application No. 2002-245068, by Fukuda Kentaro et al., filed Feb. 9, 2001, referred to hereafter as Kentaro.

Scott Tilley, Shihong Huang, "Evaluating the Reverse Engineering Capabilities of Web Tools for Understanding Site Content and Structure: A Case Study", Proceedings of the 23rd International Conference on Software Engineering (ICSE2001: May 12-19, 2001; Toronto, Canada), p. 514 to 523, Los Alamitos, Calif.: IEEE Computer Society Press, 2001, referred to hereafter as Tilley.

Ahmed E. Hassan and Richard C. Holt, "Architecture recovery of web applications", Proceedings of the 24th International Conference on Software Engineering (ICSE2002), p. 349 to 359, referred to hereafter as Hassan.

Tancred Lindholm, "A 3-way Merging Algorithm for Synchronizing Ordered Trees—The 3DM Merging and Differencing Tool for XML", Master's Thesis, Helsinki University of Technology, Sep. 13, 2001, available at www.cs.hut.fi/~ctl/3dm/ referred to hereafter as Lindholm.

Sudarshan S. Chawathe and Anand Rajaraman and Hector Garcia-Molina and Jennifer Widom, "Change Detection in Hierarchically Structured Information", Proceedings of the 1996 ACM SIGMOD International Conference on Management of Data, p. 493 to 504, referred to hereafter as Sudarshan.

BACKGROUND OF THE INVENTION

Recently, larger-scale and more complicated systems have constituted web applications utilized on a WWW (World Wide Web)-based network such as the Internet. Thus, much time and labor is required by web application managers to understand and maintain the whole system. However, emerging requirements, which were unexpected during system construction, may necessitate the reconfiguration of the existing system. Furthermore, in order to add new requirements to the existing system, the existing system may be changed while maintaining the advantages of the system.

A conventional technique for reconfiguring an existing system to a novel system is based on information contained in the specifications of a web application (refer to, for example, Yasunori and Ikuyo). Another method is to use reverse engineering of a web site to understand the configuration of the whole web site by for example, identifying web contents and objects generated and discovering correlations among them, so that a web site manager can understand and maintain the functions of the whole web site (refer to, for example, Tilley). The existing system can also be changed and reconfigured by analyzing programs running on a server (refer to, for example, Hassan).

However, for the technique of reconfiguring a system on the basis of information contained in the specifications of a web application as disclosed in Yasunori and Ikuyo, it must be a precondition that there exist specifications that enable the system to be analyzed and that the specifications are always correctly maintained. However, not all systems actually in operation have specifications. Furthermore, the time required to maintain the specifications is not negligible. Consequently, this technique is not practical in every respect.

Furthermore, static web contents are dealt with by the method of using reverse engineering of a web site to allow a web site manager to understand and maintain the functions of the whole web site as disclosed in Tilley. Reverse engineering of web contents such as JSP (JavaServer Pages™: a trademark of SUN Microsystems) and Servlet which have recently been utilized and which are dynamically generated on a server has not been realized yet.

Moreover, the technique of analyzing programs running on a server to change and reconfigure an existing system has the advantage of being able to analyze processes executed on the server such as operations of a database as disclosed in Hassan. However, since actual web applications are developed by various methods, an analysis program must be created for each of these developing methods. Furthermore, the loss of a source code or the like on the server makes it impossible to analyze the programs.

In view of the above problems, it is an object of the present invention to use objects and web contents dynamically generated on a server to generate a web application model to support a change or reconstruction of a system.

SUMMARY OF THE INVENTION

The present invention, which accomplishes this object, is implemented as a web application model generating apparatus configured as described below. This apparatus is characterized by comprising a template extracting section that analyzes configurations of static web contents captured by executing a predetermined web application to extract a template for dynamic web contents of the web application, a transition extracting section that extracts transition information on said web application to be processed on the basis of access information obtained when capturing said static web contents, and model generating means that generates a model of said web application on the basis of the template extracted by said template extracting section and the transition information extracted by said transition extracting section.

Specifically, the template extracting section compares a plurality of the static web contents with each other to extract fixed portions common to each web content as a template for the whole web contents, and if a particular display form is repeatedly used, the template extracting section extracts portions in which the particular display form is repeatedly used, as a template for the display form.

The web application model generating apparatus may further comprise a classification processing section that classifies a plurality of the static web contents into groups on the basis of visual and logical characteristics of the web contents. In this case, the template extracting section extracts a template for each of the groups into which the web contents have been classified by the classification processing section.

Furthermore, another web application model generating apparatus according to the present invention is characterized by comprising classifying means for classifying a plurality of web contents into groups in accordance with a level of similarity between the web contents, web contents analyzing means for analyzing configurations of the web contents for each of the groups into which the web contents have been classified by the classifying means, transition extracting means for extracting call information (for example, URIs (Uniform Resource Identifiers)) used between the groups and contained in the web contents, as transition information, and model generating means that generates a model of a web application on the basis of results of the analysis by the web contents analyzing means and the transition information extracted by the transition extracting means.

More preferably, the classifying means carries out classification using one or both of a determination criteria as to whether or not the plurality of web contents have similar structures and a determination criteria as to whether or not the plurality of web contents play similar roles.

In connection with the configuration of the web contents included in the same group, the web contents analyzing means identifies fixed portions common to each web content and portions varying with a situation, and within the portions varying with the situation, further identifies portions in which a particular display form is repeatedly utilized and other portions.

The web application model generating apparatus may further comprise execution supporting means for executing the web application for which a model is to be generated and log capturing means for capturing a log of operations of the execution supporting means. In this case, the classifying means classifies static web contents captured when the web application is executed by the execution supporting means, and the transition extracting means captures the transition information on the basis of the log captured by the log capturing means and results of analysis by the web contents analyzing means.

The present invention is also implemented as a web contents classifying apparatus configured as described below. This apparatus is characterized by comprising a similarity calculating section that calculates a level of similarity between a plurality of web contents by comparing descriptions in the web contents with each other to determine portions having the same structure or similar structures and portions playing the same role or similar roles, and classification executing section that classifies the plurality of web contents on the basis of the similarity levels calculated by the similarity calculating section.

More specifically, the classification executing section classifies a plurality of the web contents the similarity level of which is equal to or lower than a preset threshold, into the same group. Alternatively, the classification executing section comprises user interface means for outputting information indicating the similarity levels between the web contents calculated by the similarity calculating section and accepting an inputted instruction for a group containing predetermined web contents, and classifies the web contents on the basis of the instruction inputted using the user interface means. The user interface means can generate a screen in which symbols representing web contents are used to represent the similarity levels between the web contents calculated by the similarity calculating section, and allow a predetermined display device to display the screen.

The present invention, which accomplishes the above object, is also implemented as a web application generation supporting method which is executed by using a computer and described below. Specifically, this method is characterized by comprising a step of analyzing configurations of static web contents captured by executing a predetermined web application to extract a template for dynamic web contents of the web application and then storing the template in predetermined storage means, a step of extracting transition information on the web application on the basis of access information obtained when capturing the static web contents and then storing the transition information in predetermined storage means, and a step of generating a model of the web application on the basis of the template and transition information stored in the storage means.

Moreover, another web application generation supporting method according to the present invention is characterized by comprising a first step of classifying a plurality of static web contents into groups in accordance with a level of similarity between the static web contents and then storing results of the classification in predetermined storage means, a second step of analyzing configurations of the static web contents for each group of the static web contents contained in the classification results stored in the storage means and then storing results of the analysis in predetermined storage means, a third step of extracting call information used between said groups and contained in the static web contents, as transition information and then storing the call information in predetermined storage means, and a fourth step of generating a model of a web application on the basis of results of the analysis and the transition information stored in the storage means.

The present invention is also implemented as a program for controlling a computer to function as the above web application model generating apparatus or web contents classifying apparatus, or a program that allows a computer to execute processes corresponding to the steps of the above web application generation supporting method. This program can be provided by being stored in a magnetic disk, an optical disk, a semiconductor memory, or another recording medium or being distributed via a network.

BRIEF DESCRIPTION OF THE DRAWINGS

FIG. 1 is a diagram schematically showing an example of the hardware configuration of a computer apparatus that implements a web application model generating apparatus according to the present embodiment;

FIG. 2 is a diagram showing the functional configuration of the web application model generating apparatus according to the present embodiment which apparatus is implemented by a computer apparatus such as the one shown in FIG. 1;

FIG. 3 is a diagram showing an example of the configuration of access information captured by an access information capturing section according to the present embodiment;

FIG. 4 is a diagram showing the configuration of a classification processing section according to the present embodiment;

FIG. 5 is a diagram illustrating the concept of the similarity between the roles of static contents which concept is used in the present embodiment;

FIG. 6 is a diagram showing an example of the configuration of a cart page captured by a static contents capturing section according to the present embodiment;

FIG. 7 is a diagram showing an example of the configuration of a cart page captured by the static contents capturing section according to the present embodiment;

FIG. 8 is a diagram showing an example of the configuration of a cart page captured by the static contents capturing section according to the present embodiment;

FIG. 9 is a diagram showing an example of the configuration of a cart page captured by the static contents capturing section according to the present embodiment;

FIG. 10 is a diagram showing an example of the configuration of a cart page captured by the static contents capturing section according to the present embodiment;

FIG. 11 is a diagram showing an example of the configuration of a cart page captured by the static contents capturing section according to the present embodiment;

FIG. 12 is a diagram showing how a template is extracted from the cart pages shown in FIGS. 6 to 11;

FIG. 13 is a diagram showing portions varying with a situation which are separated from the cart pages shown in FIGS. 6 to 11;

FIG. 14 is a diagram showing how repeated portions are extracted from information on the portions varying with a situation which are shown in FIG. 13;

FIG. 15 is a diagram showing how repeated portions are extracted from article display sections shown in FIGS. 6, 7, and 10;

FIG. 16 is a diagram showing an example of the configuration of a user interface screen generated by a classification executing section according to the present embodiment;

FIG. 17 is a diagram showing the configuration of a web application model generated by model generating means according to the present embodiment;

FIG. 18 is a flow chart illustrating the flow of a process of generating a web application model according to the present embodiment; and FIG. 19 is a diagram illustrating operations performed by the web application model generating apparatus according to the present embodiment if a web application is changed.

DETAILED DESCRIPTION OF THE INVENTION

The present invention will be described below in detail on the basis of the embodiments shown in the accompanying drawings.

The present invention realizes reverse engineering of a system for a web application containing dynamically generated objects and web contents. An abstract model of the web application (hereinafter referred to as a "web application model") is thus generated to support a change or reconfiguration of the system.

In the description below,

"web contents" mean electronic documents utilized on the web,

"static web contents" mean web contents (for example, HTML, XML, and XHTML) that always return the same content in response to a call URI, and "dynamic web contents" mean web contents (for example, JSP and Servlet) that can generate a plurality of static web contents in response to a call URI.

FIG. 1 is a diagram schematically showing an example of the hardware configuration of a computer apparatus that implements a web application model generating apparatus according to the present embodiment.

The computer apparatus shown in FIG. 1 comprises a CPU (Central Processing Unit) 101 operating as arithmetic means, a main memory 103 connected to the CPU 101 via an M/B (Mother Board) chip set 102 and a CPU bus, a video card 104 connected to the CPU 101 via the M/B chip set 102 and an AGP (Accelerated Graphics Port), a hard disk 105 and a network interface 106 connected to the M/B chip set 102 via a PCI (Peripheral Component Interconnect) bus, and a floppy disk drive 108 and a keyboard/mouse 109 connected to the M/B chip set 102 via a bridge circuit 107 and a low-speed bus such as an ISA (Industry Standard Architecture) bus through the PCI bus.

FIG. 1 only illustrates the hardware configuration of a computer apparatus that implements the present embodiment. Various other configurations are possible provided that the present embodiment is applicable to them. For example, in place of the video card 104, only a video memory may be mounted so that the CPU 101 can process image data. Alternatively, a drive for a CD-R (Compact Disc Recordable) or a DVD-RAM (Digital Versatile Disc Random Access Memory) may be provided as an external storage device via an interface such as an ATA (AT Attachment) or a SCSI (Small Computer System Interface).

FIG. 2 is a diagram showing the functional configuration of a web application model generating apparatus according to the present embodiment which apparatus is implemented by a computer apparatus such as the one shown in FIG. 1.

Referring to FIG. 2, the web application model generating apparatus according to the present embodiment comprises an access support processing section 10 that supports accesses to a web application to be processed, a static contents capturing section 20 and an access information capturing section 30 which capture a log of accesses to the web application, a classification processing section 40 that classifies static contents (HTML contents) captured by static contents capturing section 20, and a template extracting section 50, a transition extracting section 60, and model generating means 70 that generate a web application model on the basis of the results of the classification and the access log.

The components shown in FIG. 2 are, for example, a software block implemented by the CPU 101, shown in FIG. 1 and controlled by a program. The program for controlling the CPU 101 to provide the above functions can be provided by being stored in a magnetic disk, an optical disk, a semiconductor memory, or another recording medium or being distributed via a network.

The access support processing section 10 supports execution of a web application. Specifically, the access support processing section 10 searches the contents provided by the web application for a next searchable link, and then executes the web application. Alternatively, the access support processing section 10 may output such a link to a display device for display to urge a user to execute the web application. For a web application already being executed according to the present embodiment, a list of information on calls during execution of the web application is recorded as access information (log) (this operation will be described later). Accordingly, this list can be captured to sequentially execute calls. The access support processing section 10 can be implemented using a conventional browser function.

The static contents capturing section 20 captures static contents on the basis of execution of a web application.

Static contents captured are HTTP responses obtained by accessing a web application, i.e. HTML, XHTML, or XML documents or HTML objects. The static contents captured are stored in predetermined storage means such as a main memory 103 or a hard disk 105, shown in FIG. 1. The contents are then used in processing executed by the classification processing section 40, described later. For the static contents captured, the access support processing section 10 also uses the static contents captured to search for a next link destination.

The access information capturing section 30 captures access information containing HTTP requests made in accessing the web application.

FIG. 3 is a diagram showing an example of the configuration of access information captured by the access information capturing section 30.

In the example shown in FIG. 3, HTTP requests issued by the access support processing section 10, the destination URIs of and communication data on the HTTP requests, and file names identifying static contents that are HTTP responses are stored in association with one another.

The access information captured by the access information capturing section 30 is stored in the predetermined storage means such as the main memory 103 or hard disk 105, shown in FIG. 1. The access information is then used in processing executed by the transition extracting section 60, described later. Furthermore, as described above, this information can be used when the access support processing section 10 executes linking in the web application.

The static contents capturing section 20 and the access information capturing section 30 are provided for a transaction between a server and a client in which the web application is executed. Specifically, the static contents capturing section 20 and the access information capturing section 30 can be implemented by a proxy server or as the functions of a browser used on the client. A conventional network technique can be used to implement the function provided by the static contents capturing section 20 and access information capturing section 30 to capture a log of HTTP requests and HTTP responses.

The classification processing section 40 calculates the characteristic amounts of static contents captured by the static contents capturing section 20 to classify the static contents, in order to extract an abstract model from a web application to be processed. The characteristic amount is used as an index to determine the level of similarity between the static contents.

FIG. 4 is a diagram showing the configuration of the classification processing section 40.

Referring to FIG. 4, the classification processing section 40 comprises a similarity calculating section 41 that calculates the level of similarity between static contents, and a classification executing section 42 that groups the static contents on the basis of the similarity levels calculated by the similarity calculating section 41. Description will be given below of processes including calculation of the similarity level and classification of contents.

Calculation of the Similarity Level

On the basis of the following concepts, the similarity calculating section 41 calculates the level of similarity between static contents. In the present embodiment, a structure similarity level and a role similarity level are defined as the concept of the level of similarity between static contents. The structure similarity level indicates whether or not static contents are similar in their structures such as page layout, and means the visual characteristics of static contents. The role similarity level indicates whether or not static contents are similar in their roles such as the presence or absence of a form and its contents, and means the logical characteristics of static contents.

To determine the structure similarity levels of static contents, the structures of tags such as <table>, <td>, and <th> in HTML which affect the layout are extracted from a plurality of static contents to be processed and are compared with each other. This enables the digitization of the similarity between the structures of a plurality of static contents. A detailed comparison can be made by associating pieces of information such as the attributes of the tags and the elements of subtrees of the tags, with each other as the tags' characteristic values. For example, the attributes of the tag <td> include <align>, <valign>, <bgcolor>, <colspan>, <rowspan>, <height>, and <width>. The size of text in a td cell, the number of links or images, or a link destination can further be used as a characteristic value. For example, the conventional technique disclosed in Kentaro can be used as the technique of determining the structure similarity level.

To determine the role similarity level of the static contents, attention is paid to the presence or absence of a form, the URI of the destination of the static contents, a transmission method, or the components of the form for comparison. For example, a <form> tag and its components such as <input>, <textarea>, <option>, <button>, and <select> are extracted from an HTML document of static contents. Then, the attributes of the tags or strings in the <option> tag are associated with the respective tags as characteristic values. Then, the similarity of the roles of a plurality of static contents can be digitized by comparing the characteristic values of the static contents with each other.

The conventional technique disclosed in Kentaro can be used as the technique of determining the role similarity level, as in the case of the structure similarity level. However, in deriving the role similarity level, structures for the HTML description and layout are neglected, such as the order of appearance of the tags and the arrangement of the tags in a table. Specifically, if two static contents are transmitted to the same URI and have respective forms indicating an equal transmission method or equal components, they are determined to have the same role regardless of their positions within the HTML document and the order of appearance of the components in the <form> elements.

FIG. 5 is a diagram illustrating the concept of the similarity between the roles of static contents.

In FIG. 5, a <form> in a document 1 which is enclosed by a solid frame 511 and a <form> in a document 2 which is enclosed by a solid frame 521 are determined to play the same role regardless of their different positions in the HTML document or different orders of appearance of LABEL, INPUT, and the like which are enclosed by a broken line. On the other hand, a <form> in the document 1 which is enclosed by a solid frame 512 and a <form> in the document 2 which is enclosed by a solid frame 522 are determined to play different roles because they have different destination URIs and different variable names regardless of exactly the same position in the HTML document and exactly the same order of appearance of the components in the <form> elements. In this manner, determinations are made on the basis of the functions of the <form>s to increase the similarity level if the static contents have respective <form>s indicating the same or a similar role, while reducing the similarity level if any form is present only in one of the static contents. The similarity level of the whole static contents can be digitized by performing the above operation on each form in the static contents to be compared.

On the basis of the concept of the characteristic amount (similarity level), for example, static contents captured exhibit numerically close visual characteristic amounts when having the same template. On the other hand, HTML contents having the same form exhibit numerically close logical characteristic amounts even if they are generated using visually different templates.

Classification of Contents

Then, the classification processing section 40 classifies static contents on the basis of the two types of similarity levels obtained as described above. A method (criteria) of classifying static contents may be based on grouping of static contents having similar structures, grouping of static contents playing similar roles, grouping of static contents both having similar structures and playing similar roles, or the like. A classifying method to be applied is preferably selected and set in accordance with the object of generation of a web application model or its application. The results of classification of static contents are stored in predetermined storage means such as the main memory 103 or hard disk 105, shown in FIG. 1. The results are then used in processing executed by the template extracting section 50 or the transition extracting section 60. To allow a user to understand the level of similarity between static contents to be processed in order to facilitate a classifying operation, it is possible to provide a user interface which displays information indicating the calculated levels of similarity between the contents and which accepts the user's manual classifying operation. This user interface will be described later.

On the basis of the results of the classification executed by the classification processing section 40, the template extracting section 50 analyzes the grouped static contents and assigns dynamic contents typified by JSP, to the individual groups. To achieve this, the template extracting section 50 identifies fixed portions common to static contents classified into the same group and portions varying with a situation. Moreover, within the portions varying with the situation, the template extracting section 50 identifies portions in which a particular display form is repeatedly utilized (repeated portions) and the other portions.

Specifically, the template extracting section 50 first separates HTML contents dynamically generated from JSPs or the like, into fixed portions shared within the group and portions varying with the situation. This separating process can be executed using an existing tool having a function of calculating a difference between documents (refer to, for example, Lindholm and Sudarshan). The fixed portions extracted from the HTML contents can be used in replacing the HTML contents with dynamic contents, as a design template for the dynamic contents.

Then, the template extracting section 50 discovers repeated portions within the portions varying with the situation and extracts the repeated display form. For example, a web application providing service for selling articles via web contents normally generates web contents (hereinafter referred to as "cart pages") playing the role of shopping carts to manage information on articles a user desires to purchase. The cart pages manage information (the name and unit price of the article, the quantity of articles to be purchased, the total price, and the like) on an article the user intends to purchase. If cart pages are displayed, they show article information filled in a display section of a predetermined shape for each managed article. Accordingly, a particular display form is repeatedly utilized (repeated portions) for the display sections corresponding to the individual articles. On the other hand, the filled article information varies with the individual articles and thus has irregular contents.

FIGS. 6 to 11 are diagrams showing examples of the configurations of cart pages captured by the static contents capturing section 20.

The cart pages in FIGS. 6 to 11 differ only in the number and displayed contents of sections 601 displaying registered article information and the value in a section 602 displaying the total amount. In the examples in FIGS. 6, 7, and 10, the number of article display sections 601 is one and the same but the number of articles to be purchased and the name of the article are different. The amount of money in the total amount section 602 is correspondingly different. FIGS. 8, 9, and 11 show two, zero, and six article display sections 601, respectively. Fixed and repeated portions are extracted from these cart pages to obtain a template for the cart pages.

FIG. 12 is a diagram showing how a template is extracted from the cart pages shown in FIGS. 6 to 11.

The template extracting section 50 first compares FIGS. 6 to 11 with one another to separate common portions from varying portions. As described above, the common portions constitute a design template for the whole cart pages. In the illustrated common portions, a shaded section 611 corresponds to the article display section 601 in the cart pages shown in FIGS. 6 to 11. Likewise, a shaded section 612 corresponds to the value in the total amount section 602 in the cart pages shown in FIGS. 6 to 11. These portions vary depending on the situation and are thus extracted.

FIG. 13 is a diagram showing the portions varying with the situation which have been separated from the cart pages shown in FIGS. 6 to 11. FIG. 13(A) shows the article display section 601 from the cart pages shown in FIGS. 6 to 11. FIG. 13(B) shows the values filled in the total amount section 602 from the cart pages shown in FIGS. 6 to 11.

The template extracting section 50 detects a repeated display form from these portions varying with the situation. In this case, text or the like filled in a particular display section is abstracted. A predetermined conventional technique can be used to abstract the information.

FIG. 14 is a diagram showing how a repeated portion is extracted from information on the portions varying with the situation, shown in FIG. 13.

As shown in FIG. 14, a display form such as a display example 1401 is detected in FIG. 13(A) as a repeated portion. "shorttext" and "digit" in the display example 1401 are abstract expressions of information present at the corresponding positions. "shorttext" means the description of a predetermined text. "digit" means the description of a predetermined number. The template extracting section 50 uses a tag structure of a repeated portion such as the one shown in FIG. 14, in replacing HTML contents with dynamic contents, as a design template for the display form of the dynamic contents.

Furthermore, if the template extracting section 50 detects such a repeated portion, it can display this portion on a predetermined display device to present the user the tag structure and a display example of this portion. The template extracting section 50 can also present the user the values for abstracted portions (in the example shown in FIG. 14, "shorttext" and "digit") of the tag structure which values are actually used in the sample. Consequently, if fixed values or strings are actually inputted, the user can select any of them. Furthermore, the user can use this information as a criteria to arrange Tag Libraries, JavaBeans™ (a trademark of SUN Microsystems), or the like in dynamic contents.

To discover a repeated portion, it must be displayed at least twice (this will hereinafter be referred to as a "repeated display"). However, although there is actually a possibility that the repeated portion is displayed twice or more, it may not appear at least twice in execution samples captured. For example, in the above example of cart pages, FIGS. 6, 7, and 10 each show only one article display section 601. Only with these samples, it is impossible to determine whether or not the article display section 601 is a repeated display form.

Thus, in this case, a display form used as a repeated portion can be extracted by capturing again samples containing the repeated display or collecting relevant portions from the contents in the group and falsely creating a repeated display to search for this repeated display.

FIG. 15 is a diagram showing how a repeated portion is extracted from the article display sections 601 shown in FIGS. 6, 7, and 10.

As shown in FIG. 15, by collecting the article display sections 601 from FIGS. 6, 7, and 10 to search for the repeated display, a display form is detected which corresponds to abstraction of the article display sections 601.

Portions which are left after the processing by the template extracting section 50 and which vary with the situation and do not belong to the repeated portion are determined to be varied by a user desiring the HTML contents or depending on the time at which the HTML contents are generated (for example, messages such as "Welcome, Mr. (Ms.) X", "Good Morning", "Hello", and "Service Time Over").

The above classification allows the identification of the positions and applications of modules such as JavaBeans™ or tag libraries in the dynamic contents. Consequently, when a web site (a system including the web application) is reconstructed, these modules can be efficiently reused.

The transition extracting section 60 extracts transitions from the web application on the basis of access information captured by the access information capturing section 30 and the groups of static contents classified by the classification processing section 40. First, on the basis of the results of the classification by the classification processing section 40, the groups are assigned to the HTML requests and responses contained in the access information. Then, parameter portions are extracted from the URIs contained in the access information. At this time, if it is possible to use knowledge inherent to the existing web application to be subjected to a process such as reconstruction, server logic calls can be estimated. For example, if the URI ends with ".do", this corresponds to an action call in Struts, which is a part of the Apache Jakarta Project and is a web application framework. Thus, information on transitions in the application can be extracted on the call URIs for the groups and the required parameters.

The model generating means 70 generates an abstract model of the web application using the dynamic contents including the template extracted by the template extracting section 50 as well as the transition information extracted by the transition extracting section 60. The generated model is stored in, for example, the hard disk 105, shown in FIG. 1. The model is then utilized to change or reconstruct the existing web application to be processed.

Now, description will be given of a user interface provided by the classification executing section 42 of the classification processing section 40.

The classification executing section 40 generates a user interface screen displaying information on the levels of similarity between the static contents calculated by the similarity calculating section 41, to display the user interface screen on the predetermined display device.

FIG. 16 is a diagram showing an example of the configuration of the user interface screen generated by the classification executing section 42.

The user interface screen in FIG. 16 shows a graph containing graphics representing the static contents captured by the static contents capturing section 20 and star-shaped graphics representing the logic of action calls. The edges between the graphics correspond to the transitions between the static contents captured, i.e. possible transitions in the web application. This means that edged action calls allow static contents corresponding to predetermined graphics to change to static contents corresponding to other similarly edged graphics.

In this screen, the graphics representing the static contents are arranged so that the level of similarity between a pair of static contents calculated by the similarity calculating section 41 is reflected in the distance between the corresponding pair of graphics. Specifically, for a pair of static contents determined to have a high similarity level, the distance between the corresponding pair of graphics on the screen is short.

The user can select and group desired static contents by performing operations such as one of dragging a mouse to enclose desired graphics and clicking them. The classification executing section 42 accepts the user's operations and classifies the static contents in accordance with the operations. If the classification executing section 42 groups the static contents on the basis of a preset threshold, the results of the grouping can be reflected in the user interface screen. On the screen, the broken lines each enclosing several static contents indicates groups obtained as a result of the classification of the static contents. The user can change the classification of the static contents to desired contents by performing an operation of modifying the broken lines on the screen.

On the user interface screen, the user can arrange graphics on the basis of only the similarity of the structures or roles of static contents or can weight the graphics with two types of similarity levels for display. Specifically, the similarity level can be represented by the distance between graphics by displaying web contents as small graphics such as thumbnails. An alternative representing means uses characters representative of web contents and numerical values representative of similarity levels. Consequently, the user can execute and modify the classification of the static contents by displaying the user interface screen while changing the weights of the similarity levels.

As described above, the static contents are classified and then processed by the template extracting section 50 and the transaction extracting section 60. Then, the model generating means 70 generates a web application model. The configuration of the web application model can be outputted to the display device or the like for display using an existing editor. For example, if the UML (Unified Modeling Language) is used as a descriptive language for a web application model, the model can be outputted as various diagrams such as a component and class diagrams.

FIG. 17 is a diagram showing the configuration of a web application model generated by the model generating means 70 on the basis of the results of classification shown in FIG. 16 (enclosed by the broken lines).

As shown in FIG. 17, this web application model comprises two dynamic contents composed of article catalog pages (catalog pages) and cart pages, as well as a checkout page with which articles to be purchased are determined (as shown in FIG. 16, this page is composed of one type of static content). The model also comprises logic called from a catalog page or a cart page to shift to another cart page, logic called from a cart page or the checkout page to shift to a catalog page, and logic called from a cart page to shift to the checkout page.

FIG. 18 is a flow chart illustrating the flow of a process of generating a web application model using the web application model generating apparatus according to the present embodiment, configured as described above.

Referring to FIG. 18, a web application for which a model is to be generated is executed in a normal execution environment (step 1801). It is contemplated that the user may operate a browser to execute the web application or the web application may be automatically executed using the functions of the access support processing section 10 or the like. When the web application is executed, the static contents capturing section 20 and the access information capturing section 30 capture static contents and access information (step 1802).

Steps 1801 and 1802 are repeated until all the contents provided by the web application are executed by following links in the web application (step 1803). Once the web application is completely executed, the classification processing section 40 calculates the level of similarity between the static contents captured (step 1804). On the basis of the results of calculation of the similarity level, the static contents are classified (step 1805). The results of the classification are held in, for example, the main memory 103 or the like, shown in FIG. 1. It is also possible to generate a user interface screen such as the one shown in FIG. 15 or to accept the user's classification or modification of the results of the classification.

Then, the template extracting section 50 extracts a template for dynamic contents for each of the groups into which the static contents have been classified (step 1806). In the present embodiment, as described above, the template is constructed by identifying common portions (fixed portions) and different portions (portions varying with the situation) at a node level. Consequently, dynamic contents can be accurately generated.

Then, the transition extracting section 60 extracts transitions between the groups into which the static contents have been classified, on the basis of the template extracted by the template extracting section 50 and the access information captured by the access information capturing section 30 (step 1807).

Finally, the model generating means 70 generates an abstract model of the web application on the basis of the template for the dynamic contents extracted by the template extracting section 50 as well as the transition information extracted by the transition extracting section 60 (step 1808).

Description will be given of the update of a model corresponding to an existing web application which update is executed using the web application model generating apparatus according to the present embodiment if the web application has been updated.

It is assumed that a part of the existing web application is changed. In this case, it is assumed that static contents "03.html" and "09.html" generated by the web application are changed.

FIG. 19 is a diagram illustrating operations performed by the web application model generating apparatus according to the present embodiment if the web application is changed.

First, the access support processing section 10 executes the web application. The static contents capturing section 20 and the access information capturing section 30 capture static contents and access information, respectively. At this time, if the changed part can be identified, static contents and access information may be captured by executing this part. On the other hand, if the whole web application is executed, updated static contents can be identified by comparing non-updated static contents already captured using a tool for calculating differences between documents, with updated static contents newly captured. In the example shown in FIG. 19, the static contents "03.html" and "09.html" and the last line of the access information are identified as the changed portions.

Then, the classification processing section 40 classifies the static contents captured. At this time, by classifying only the updated static contents, the results of the classification can be incrementally added to the non-updated classification. If the updated static contents belong to any of the non-updated groups, the number of dynamic contents generated remains unchanged. Thus, a changing operation corresponding to the updated contents is preformed on the group to which the static contents belong. On the other hand, if the updated static contents do not belong to any of the non-updated groups, they are recognized as a new group. Consequently, dynamic contents are generated. In the example shown in FIG. 19, the static contents "03.html" and "09.html" belong to the group "group B". Thus, the dynamic contents corresponding to the group "group B" are changed.

Then, the template extracting section 50 and the transition extracting section 60 execute processes based on the results of the classification executed by the classification processing section 40 as well as the access information captured by the access information capturing section 30. Subsequently, the model generating means 70 generates an updated web application model. In the example shown in FIG. 19, the web application model is updated by changing the dynamic contents corresponding to the group "group B" as described above. Specifically, the template extracting section 50 executes detailed recalculation of the changed portions on the group "group B". the model generating means 70 reflects the results of the calculation in the web application model.

The present embodiment has been described in conjunction with the system and method for generating a web application model for dynamic web contents. However, the present invention is applicable not only to web applications but also to other common systems from and to which the user captures and inputs information using a GUI and which execute processes on the basis of the input.

For example, the present invention is applicable to a system in which a host computer is operated using, for example, a 3270 or 5250 terminal manufactured by IBM Corporation, U.S. In this case, a screen display on the 3270 terminal corresponds to the display form of the web contents in the above described embodiment. The roles of the web contents in the embodiment correspond to the assignment of functions to various function keys as well as input items.

Moreover, call information is obtained by analyzing transactions based on the HTTP protocol. However, when the host computer is operated, call information can be obtained by analyzing transactions based on the 3270 protocol, or the like. Then, a model and template of an application in the host computer can be generated by applying the present invention to the call information and carrying out grouping by calculating the similarity level on the basis of the screen display on the 3270 terminal, the assignment of the functions to the function keys, and the input items.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular SYSTEM, METHOD, AND COMPUTER PROGRAM PRODUCT FOR GENERATING A WEB APPLICATION WITH DYNAMIC CONTENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

We claim:

1. A computer-implemented web contents classifying apparatus embodied on a computer apparatus, comprising:
    a similarity calculating section that calculates levels of similarity between a plurality of web contents by comparing descriptions in said web contents with each other to determine portions having same and similar structures and portions playing same and similar roles; and
    a classification executing section that classifies said plurality of web contents based on said similarity levels,
        wherein said classification executing section classifies a plurality of said web contents having a similarity level equal to or lower than a preset threshold into a same group,
        wherein said classification executing section comprises user interface means for outputting information indicating said similarity levels and accepting an inputted instruction for a group containing predetermined web contents, and classifies said web contents based on said inputted instruction, and
        wherein said user interface means generates a screen in which symbols representing web contents represent said similarity levels, and
        wherein a first symbol type represents static contents, and a second differently-shaped symbol type represents action call logic.

2. The apparatus of claim 1, wherein edges between said symbols correspond to web application transitions.

3. A computer-implemented web contents classifying apparatus embodied on a computer apparatus, comprising:
    a similarity calculating section that calculates levels of similarity between a plurality of web contents by comparing descriptions in said web contents with each other to determine portions having same and similar structures and portions playing same and similar roles; and
    a classification executing section that classifies said plurality of web contents based on said similarity levels,
        wherein said classification executing section classifies a plurality of said web contents having a similarity level equal to or lower than a preset threshold into a same group,
        wherein said classification executing section comprises user interface means for outputting information indicating said similarity levels and accepting an inputted instruction for a group containing predetermined web contents, and classifies said web contents based on said inputted instruction, and
        wherein said user interface means generates a screen in which symbols representing web contents represent said similarity levels, and
        wherein static contents are arranged on said screen so that the level of similarity between a pair of static contents calculated by said similarity calculating section is reflected in the distance between the corresponding ones of said symbols representing web contents.

4. The computer-implemented web contents classifying apparatus of claim 3 wherein said similarity calculating section calculates a structure similarity level indicative of whether or not static contents are similar in their structure, and wherein said similarity calculating section calculates a role similarity level indicative of whether or not static contents are similar in their roles.

* * * * *